United States Patent Office 3,508,480
Patented Apr. 28, 1970

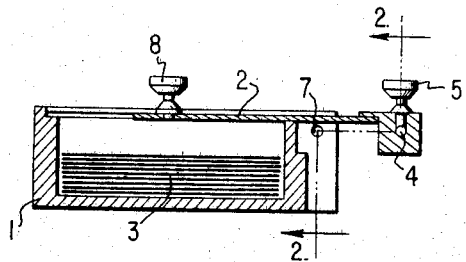
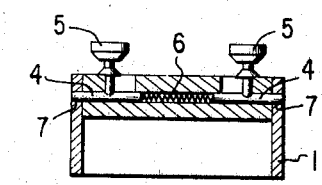
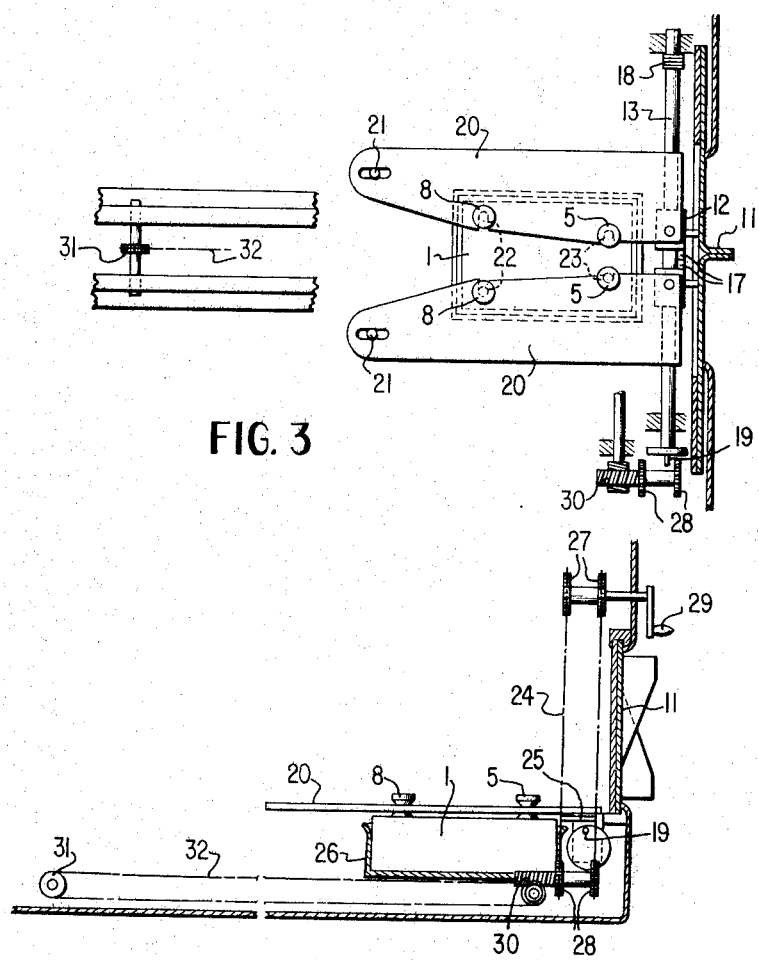

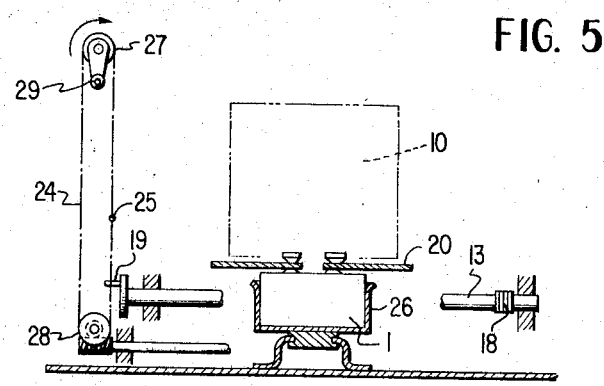
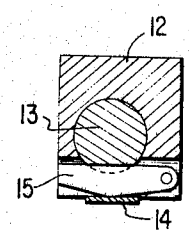
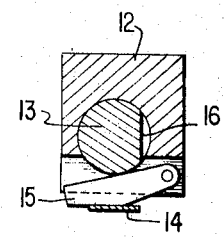
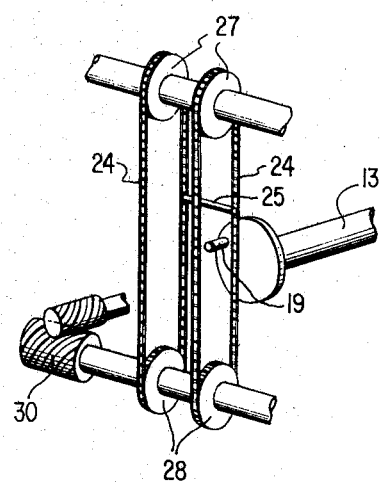

3,508,480
FILM LOADING DEVICE OF A MICROFICHE CAMERA
Yoshio Hakamata and Kiyoji Nakamura, Tokyo, Japan, assignors to Fuji Shashin Film Kabushiki Kaisha, Ashigara-Kamigun, Kanagawa, Japan
Filed Oct. 9, 1967, Ser. No. 673,746
Claims priority, application Japan, Oct. 14, 1966, 41/95,101
Int. Cl. G03b 19/10
U.S. Cl. 95—19                                 5 Claims

ABSTRACT OF THE DISCLOSURE

A film loading device in a microfiche camera utilizing a film magazine which is adapted to be loaded into the camera. The magazine has a shutter interlocked to a sliding door of the loading port of the camera so that the shutter may be opened after the magazine is positioned within the camera but remains closed and locked during magazine positioning in and removal from the camera.

BACKGROUND OF THE INVENTION

The requirement for polyester film for microfiches which is strong and has little elasticity has increased. It is possible to make microfiches by taking the pictures on a roll film loaded in a microfiche camera. Since the polyester base is tough and accuracy of the dimension is required in microfiche films, a cutting machine having high accuracy and high efficiency is needed. A camera equipped with a developing device and having efficiency to make even a few sheets of microfiches rapidly is not only complicated, but the price is high.

It is, therefore, advantageous to use microfilm which is already cut in standardized sizes of the microfiches in order to rapidly produce the microfiche.

SUMMARY OF THE INVENTION

This invention relates to a film loading device for a microfiche camera using microfilms which are cut to a fixed size beforehand, and in particular to a film loading device in which a film magazine containing the microfilms having a sliding shutter is put in the device through a loading port. When a sliding door of the loading port is closed the door is locked and the interlock between the shutter and the body of the magazine is set free. Then the body of the magazine carrying exposed film is moved into the exposure position. When the magazine is taken out of the camera, the body of the magazine first moves back to the loading port and thereafter the sliding shutter is closed while the sliding door in unlocked. When the sliding door is opened, the sliding shutter and the body of the magazine are engaged with each other with the shutter closed.

BRIEF DESCRIPTION OF THE DRAWING

FIG. 1 is a side sectional view showing the film magazine with a partially opened shutter thereof for a film loading device in accordance with the present invention;

FIG. 2 is a sectional view taken along the line 2—2 in FIG. 1;

FIG. 3 is a plan view of the main part of the film magazine loading compartment of the microfiche camera;

FIG. 4 is a side view thereof;

FIG. 5 is a front view thereof viewed from the loading port of the film magazine;

FIG. 6 is an elevational sectional view of a portion of the apparatus showing the guiding rail and the sliding member near the engaging groove, where the sliding door of the loading port of the magazine is locked;

FIG. 7 is an elevational sectional view of the portion of the apparatus of FIG. 6 with the sliding door set free; and FIG. 8 is a perspective view of the mechanism for locking and setting free the sliding door.

DESCRIPTION OF THE PREFERRED EMBODIMENT

Referring to the drawings, in FIGS. 1 and 2 showing the film magazine, reference character 1 represents the body portion of the film magazine, a sliding shutter 2 closes along the groove provided on the body portion of the magazine 1 preventing access to sheet films 3. A pin 4 having a sloped portion on the top end thereof is integral with movable knobs 5 on the outer surface of said sliding shutter. A spring 6 urges said pin 4 outward. The hole 7, provided on the body portion 1 receives the pin 4. Fixed knobs 8 are carried by sliding shutter 2. FIGS. 3 through 5 show the main part of a microfiche camera, including a magazine loading port 10, and a sliding door 11; sliding members 12 slide along a rotatable guiding rail 13, connected to sliding door 11. On the sliding member 12 there is provided a stop lever 15, urged by a spring plate 14 as shown in FIGS. 6 and 7. Stop lever 15 is engaged with the groove 16 of the guide rail 13 when the sliding door 11 is completely closed, as shown in FIG. 6. The reference character 17 represents the spring for urging said sliding members in the direction in which the sliding members separate each other. A torsion spring 18 angularly urges guide rail 13 from the position seen in FIG. 7, to that in FIG. 6. A pin 19 rotates said guide rail 13 in the opposite direction against spring 18. A lever 20 is pivotally mounted on sliding member 12 at one end and on a fixed pin 21 at the other end thereof. The apparatus further includes notches 22 and 23 formed on lever 20, chain 24, a connection rod 25 mounted on said chains, a magazine fixing plate 26, sprockets 17 and 28, a handle 29 for rotating sprocket 27, a spiral gear 30, a sprocket 31 and a chain 32 for carrying the magazine fixing plate 26.

In the device constructed as described above, micro sheet films cut in accordance with the standard of the microfiche are put into said magazine 1 in a dark room. When the sliding shutter 2 is closed along the groove, the pin 4 of the sliding shutter 2 moves into a hole 7 of the body portion of said magazine, and said sliding shutter 2 is locked to said body portion 1 of the magazine. In this connection, the microfilm compartment is completely light shielded and the film magazine can be brought out into a bright room. Then the sliding doors 11, 11 of the microfiche camera are opened to let the film magazine be positioned on the magazine fixing plate 26 through film magazine loading port 10. Both sliding doors are then closed to shield the microfiche camera completely. At this time, as the groove 16 of said guide rail 13 is forced downward by means of said spring 18, the springs 17, 17 of the sliding member 12 which slides along said guide rail 13 relative to sliding door 11 are compressed. The stop lever 15 and the groove 16 are brought into engagement with each other and the sliding door 11 is therefore locked. At the same time, levers 20, 20 rotate about said pins 21, which results in notches 22 engaging the fixed knobs 8 on the shutter 20 of the magazine and the notches 23 pushing movable knobs 5 inward. Pin 4 is thus removed from hole 7 against the bias of spring 6 to set said sliding shutter 2 free from said body portion 1 of the magazine. And then, when the handle 29 is rotated in the counterclockwise direction, FIG. 5, chain 32 is driven through sprockets 27, 28 and chain 24, by means of spiral gear 30 and magazine fixing plate 26 is carried to the left, FIGS. 3 and 4. As the both knobs 5 and 8 of the sliding shutter 2 are engaged by lever 20, only the body portion 1 of the magazine is carried with exposed sheet films 3 to a fixed position The microfilms 3 are then removed one by one for developing. Thus, the sliding door 11 is never opened while the films are exposed due to the engagement of said stop lever 15 with said groove 16. If the handle 29 is rotated in the clockwise direction after some photographings, the magazine fixing plate 26 is moved rightward and said sliding shutter 2 becomes locked to the body portion 1 of the film magazine to light shield the film compartment since connection rod 25 of the chain 24 rotates said pin 19 against the bias of spring 18. The stop lever 15 and the groove 16 are thus returned to the position shown in FIG. 7. Sliding members 12 are then separated from each other by said springs 17, 17 removing the interlock on magazine shutter. The stop lever 15 and the groove 16, are therefore, not engaged with each other and the sliding door 11 can be opened, even if the guide rail 13 rotates with the force of said spring 18. When the sliding door 11 is opened, lever 20 frees the fixed knob 8 and the movable knob 5 and the pin 4 of the sliding shutter 2 moves into the hole 7 of the body portion 1 by means of the spring 6. Thus the body portion of the magazine is locked to the sliding shutter 2, and the magazine is now able to be removed from the magazine loading port 10.

In the film loading device in accordance with this invention as described above using polyester films having good elasticity which is important in microfilms requiring high accuracy, the operation to load the film into the camera is much simplified and reliable. It is easy to load the film into the magazine in the dark. Moreover, as the magazine loading port cannot be opened while the film is exposed in the magazine after the magazine is loaded into the camera, an extremely high safety is gained.

We claim:

1. In a microfiche camera using a film magazine containing sheet film and having a disengageable cover, a film loading device comprising: a rotatable guide rail, a movable door carried thereby, means carried by said door and responsive to said closure thereof for mechanically interlocking said cover to said door means but allowing said magazine body to move relative to said cover means, means for rotating said guide rail into door locking position upon closure thereof, means for moving said magazine relative to said cover after closure of said door to allow selective removal of said films from said magazine and means responsive to return of said magazine to closed cover position for automatically rotating said rotatable guide rail and releasing said door locking means.

2. The film loading device as claimed in claim 1 wherein said means for moving said film magazine relative to said magazine cover and said means for positively rotating said rotatable guide rail comprises and endless chain and said device further includes manual means for rotating the chain in a first direction to cause said magazine to move away from said cover to expose the magazine contents and in a second direction to move said magazine in cover closing direction and to simultaneously rotate said rotatable guide rail into door release position.

3. The film loading device as claimed in claim 1 wherein said film magazine further includes locking means for normally maintaining said cover locked when in closed position and said device further includes means responsive to closure of said door for disengaging said film magazine cover locking means whereby said film magazine body may be moved relative to said film magazine cover to expose the magazine contents.

4. The device as claimed in claim 3 wherein said film magazine cover locking means comprises a spring biased pin means normally carried by said cover and normally received within a film magazine body recess, and a knob carried by said cover and movable therewith for moving said locking pin means against its bias, and said means for interlocking said cover to said door comprises at least one lever member carried thereby, notches formed within said lever member and adapted to receive said cover knob whereby, pivoting of said lever in a first direction upon closure of said door means, acts to move said knob and said pin against the spring bias to unlock said film magazine cover and movement of said film magazine support relative to said door and said pivotal lever in another direction acts to open said unlocked cover relative to said film magazine and to expose the contents of said magazine.

5. The film loading device as claimed in claim 2 wherein said means for positively rotating said rotatable guide rail comprises a bar carried by said endless chain and an eccentric carried by said rotatable guide rail, positioned in the path of said endless chain and said transverse bar, and said device further includes a torsion spring, normally biasing said guide rail into door locking position, whereby, said bar in contacting said eccentric, acts to rotate said rotatable guide rail about its axis in a direction opposite the bias of said torsion spring.

References Cited

UNITED STATES PATENTS 2,237,656   4/1941   Covell _____ 95—23

JOHN M. HORAN, Primary Examiner